United States Patent
Lin et al.

(10) Patent No.: US 8,254,453 B2
(45) Date of Patent: Aug. 28, 2012

(54) MULTI-FORMAT VIDEO DECODER AND RELATED DECODING METHOD

(75) Inventors: Chan-Shih Lin, Tainan County (TW); Shu-Hsien Chou, Tainan County (TW); Kuei-Lan Lin, Tainan County (TW)

(73) Assignee: Himax Media Solutions, Inc., Xinshi Dist., Tainan (TW)

( * ) Notice: Subject to any disclaimer, the term of this patent is extended or adjusted under 35 U.S.C. 154(b) by 361 days.

(21) Appl. No.: 12/690,921

(22) Filed: Jan. 20, 2010

(65) Prior Publication Data

US 2011/0176609 A1    Jul. 21, 2011

(51) Int. Cl.
*H04N 7/12* (2006.01)
*H04N 7/26* (2006.01)

(52) U.S. Cl. .......... 375/240.15; 375/240.12; 375/240.01
(58) Field of Classification Search ............... 375/240.15
See application file for complete search history.

(56) References Cited

U.S. PATENT DOCUMENTS

| 2005/0094729 A1* | 5/2005 | Yuan et al. ............... 375/240.16 |
| 2007/0047651 A1* | 3/2007 | Kim et al. ............... 375/240.16 |
| 2011/0110435 A1* | 5/2011 | Li et al. .................. 375/240.25 |

OTHER PUBLICATIONS

Ju, C. et al.; A 125 Mpixels/sec Full-HD MPEG-2/H.264/VC-1 Video Decoder for Blu-ray Applications; IEEE Asian Solid State Circuits Conference, Nov. 3-5, 2008, pp. 9-12.*
Bae, J. et al. ,"A Decoupled architecture for Multi-format Decoder", IEICE Electronics Express, Sep. 25, 2008, vol. 5, No. 18, pp. 705-710.*

* cited by examiner

*Primary Examiner* — David Czekaj
*Assistant Examiner* — Maria Vazquez Colon
(74) *Attorney, Agent, or Firm* — Winston Hsu; Scott Margo (57) ABSTRACT

A multi-format video decoder includes a bitstream buffer, a system controller, a bitstream decoding unit, an intra mode decoding unit and a shared prediction module. The system controller selectively generates a first control signal or a second control signal according to a video bitstream. The bitstream decoding unit generates a decoding information signal according to the video bitstream when receiving the first control signal. The intra mode decoding unit generates an intra mode signal when receiving the second control signal. The shared prediction module performs an AC/DC prediction upon a current block of the video bitstream to generate a current first prediction result according to the decoding information signal and performs an intra prediction upon the current block to generate a current second prediction result according to the intra mode signal. The shared prediction module includes shared components being utilized in the AC/DC prediction and the intra prediction.

19 Claims, 5 Drawing Sheets

MULTI-FORMAT VIDEO DECODER AND RELATED DECODING METHOD

BACKGROUND OF THE INVENTION

1. Field of the Invention

The present invention relates to a multi-format video decoder and related method, and more particularly, to a multi-format video decoder including shared components of a prediction module in both AC/DC prediction operation and intra prediction operation and a related method.

2. Description of the Prior Art

A multi-format video decoder is capable of supporting various kinds of video standards, such as an MPEG-4 specification, a VC-1 specification, an H.264/AVC specification, a RMVB specification, or an AVS specification. For intra-block/intra-macroblock on common video compression technology, there are some correlations between current blocks/macroblocks and neighboring blocks/macroblocks. For example, AC/DC prediction is based on frequency domain and used under the MPEG-4 specification and the VC-1 specification. Intra prediction is based on spatial domain and used under the H.264/AVC specification, the RMVB specification, and the AVS specification.

Typically, individual hardware components for the AC/DC prediction and the intra prediction are required for a multi-format video decoder under different specifications. As a result, individual hardware components may increase cost and occupy chip areas. However, there are lots of similarities between the AC/DC prediction and the intra prediction; and practically the AC/DC prediction and the intra prediction will not be used at the same time for each specification.

Hence, how to save the cost and the chip areas of the multi-format video decoder have become an important topic of the field.

SUMMARY OF THE INVENTION

It is one of the objectives of the claimed invention to provide a multi-format video decoder and a related method to solve the abovementioned problems.

According to one embodiment, a multi-format video decoder is provided. The multi-format video decoder includes a bitstream buffer, a system controller, a bitstream decoding unit, an intra mode decoding unit, and a shared prediction module. The bitstream buffer is used for providing a video bitstream. The system controller is coupled to the bitstream buffer, for selectively generating a first control signal or a second control signal according to an information of the video bitstream. The bitstream decoding unit is coupled to the system controller and the bitstream buffer, for generating a decoding information signal according to the information of the video bitstream when receiving the first control signal. The intra mode decoding unit is coupled to the system controller, for generating an intra mode signal when receiving the second control signal. The shared prediction module is coupled to the bitstream decoding unit and the intra mode decoding unit, for performing an AC/DC prediction operation upon a current block of the video bitstream to generate a current first prediction result according to the decoding information signal, and for performing an intra prediction operation upon the current block to generate a current second prediction result according to the intra mode signal; wherein the shared prediction module includes at least one shared component which is utilized in each of the AC/DC prediction operation and the intra prediction operation.

According to one embodiment, a decoding method is provided. The decoding method includes the steps of: providing a video bitstream; selectively generating a first control signal or a second control signal according to an information of the video bitstream; when receiving the first control signal, generating a decoding information signal according to the information of the video bitstream; performing an AC/DC prediction operation upon a current block of the video bitstream according to the decoding information signal via a shared prediction module, such that a current first prediction result is generated; when receiving the second control signal, generating an intra mode signal; and performing an intra prediction operation upon the current block according to the intra mode signal via the shared prediction module, such that a current second prediction result is generated; wherein the shared prediction module includes at least one shared component which is utilized in each of the AC/DC prediction operation and the intra prediction operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
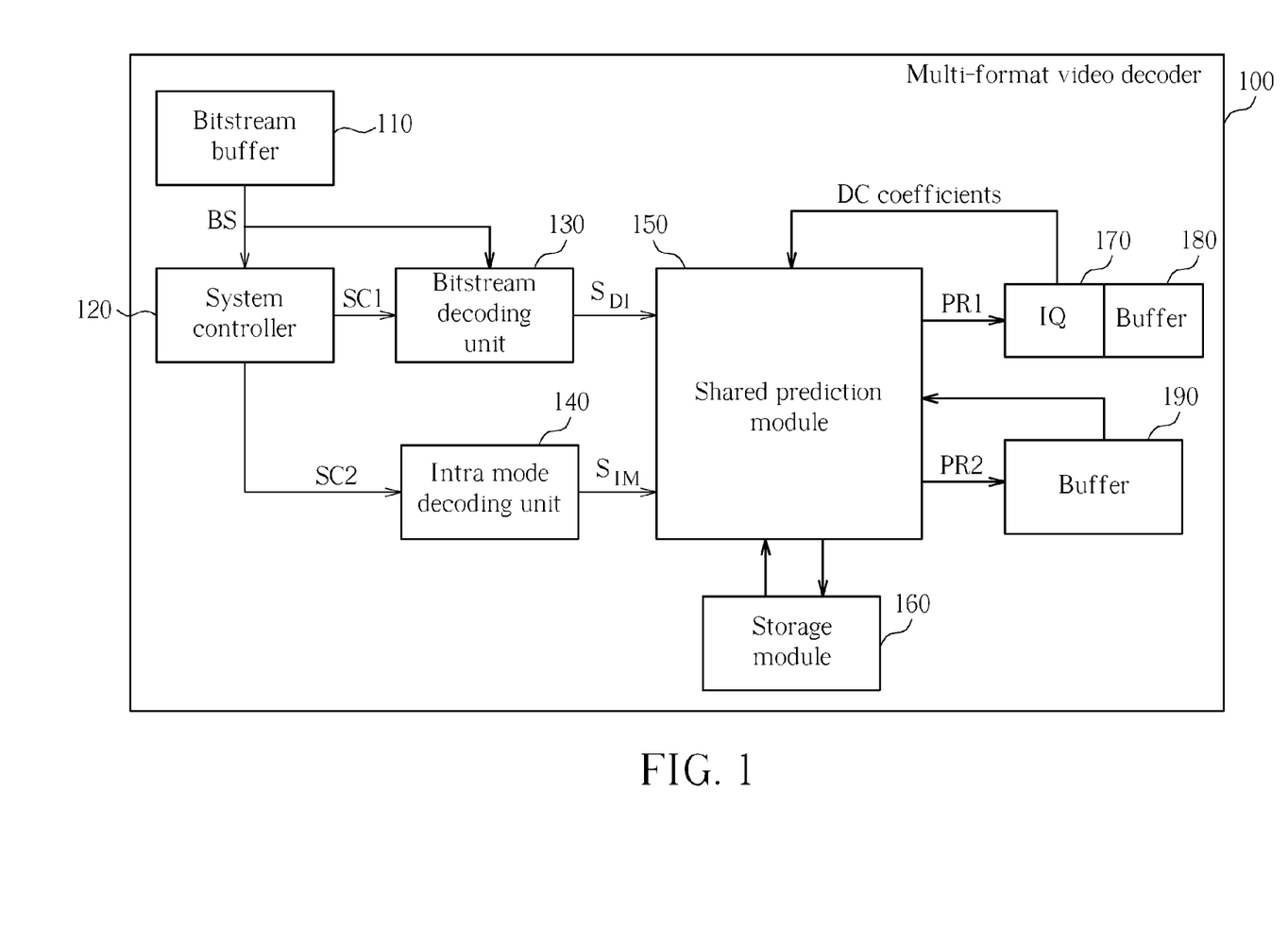
FIG. 1 is a block diagram of a multi-format video decoder according to an embodiment of the present invention.

FIG. 1 is a block diagram of a multi-format video decoder 100 according to an embodiment of the present invention. The multi-format video decoder 100 includes, but is not limited to, a bitstream buffer 110, a system controller 120, a bitstream decoding unit 130, an intra mode decoding unit 140, a shared prediction module 150, and a storage module 160. The bitstream buffer 110 provides a video bitstream BS. The system controller 120 is coupled to the bitstream buffer 110 for selectively generating a first control signal SC1 or a second control signal SC2 according to an information of the video bitstream BS. The bitstream decoding unit 130 is coupled to the system controller 120 and the bitstream buffer 110, for generating a decoding information signal $S_{DI}$ according to the information of the video bitstream BS when receiving the first control signal SC1. The intra mode decoding unit 140 is coupled to the system controller 120 for generating an intra mode signal $S_{IM}$ when receiving the second control signal SC2, wherein the intra mode signal $S_{IM}$ indicates which mode of the intra prediction operation that the shared prediction module 150 performs.

After that, the shared prediction module 150 is coupled to the bitstream decoding unit 130 and the intra mode decoding unit 140, for performing an AC/DC prediction operation upon a current block (e.g., a 4×4 block) of the video bitstream BS to generate a current first prediction result PR1 according to the decoding information signal $S_{DI}$, and for performing an intra prediction operation upon the current block to generate a current second prediction result PR2 according to the intra mode signal $S_{IM}$. What calls for special attention is that the shared prediction module 150 includes at least one shared component which is utilized in each of the AC/DC prediction operation and the intra prediction operation, and detailed operations of the shared prediction module 150 will be further illustrated in the following embodiments. In addition, the storage module 160 is coupled to the shared prediction module 150 for storing the current first prediction result PR1 and the current second prediction result PR2, and for storing a previous first prediction result (e.g., PR11) and a previous second prediction result (e.g., PR22). Be noted that the previous first prediction result PR11 is generated by performing the AC/DC prediction operation upon a decoded block of the video bitstream BS which is previously decoded prior to the current block; and the previous second prediction result PR22 is generated by performing the intra prediction result upon the decoded block, which is sited on top, left, and top-left from current block.

Moreover, the multi-format video decoder 100 further includes an inverse quantization unit 170, a first buffer 180, and a second buffer 190. The inverse quantization unit 170 performs an inverse quantization operation upon the current first prediction result PR1 in order to obtain DC coefficients, and the first buffer 180 stores the current first prediction result PR1. In addition, the second buffer 190 stores the current second prediction result PR2. Since operations of these components are already well-known to a person of average skill in the pertinent art, therefore, additional description is omitted here for brevity.

Figure 2:
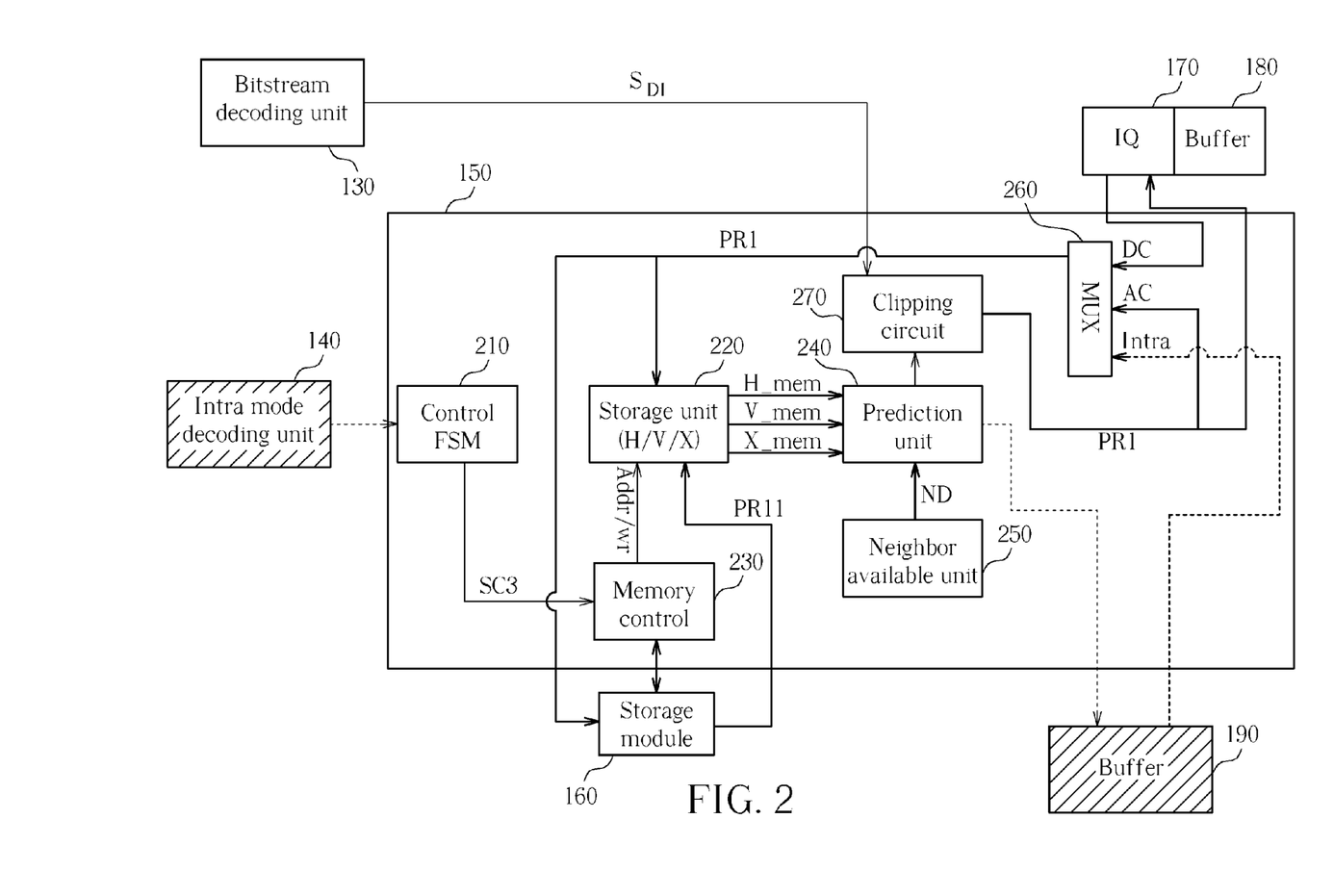
FIG. 2 and FIG. 3 are diagrams showing detailed components and detailed data flow of the shared prediction module shown in FIG. 1.
Figure 3:
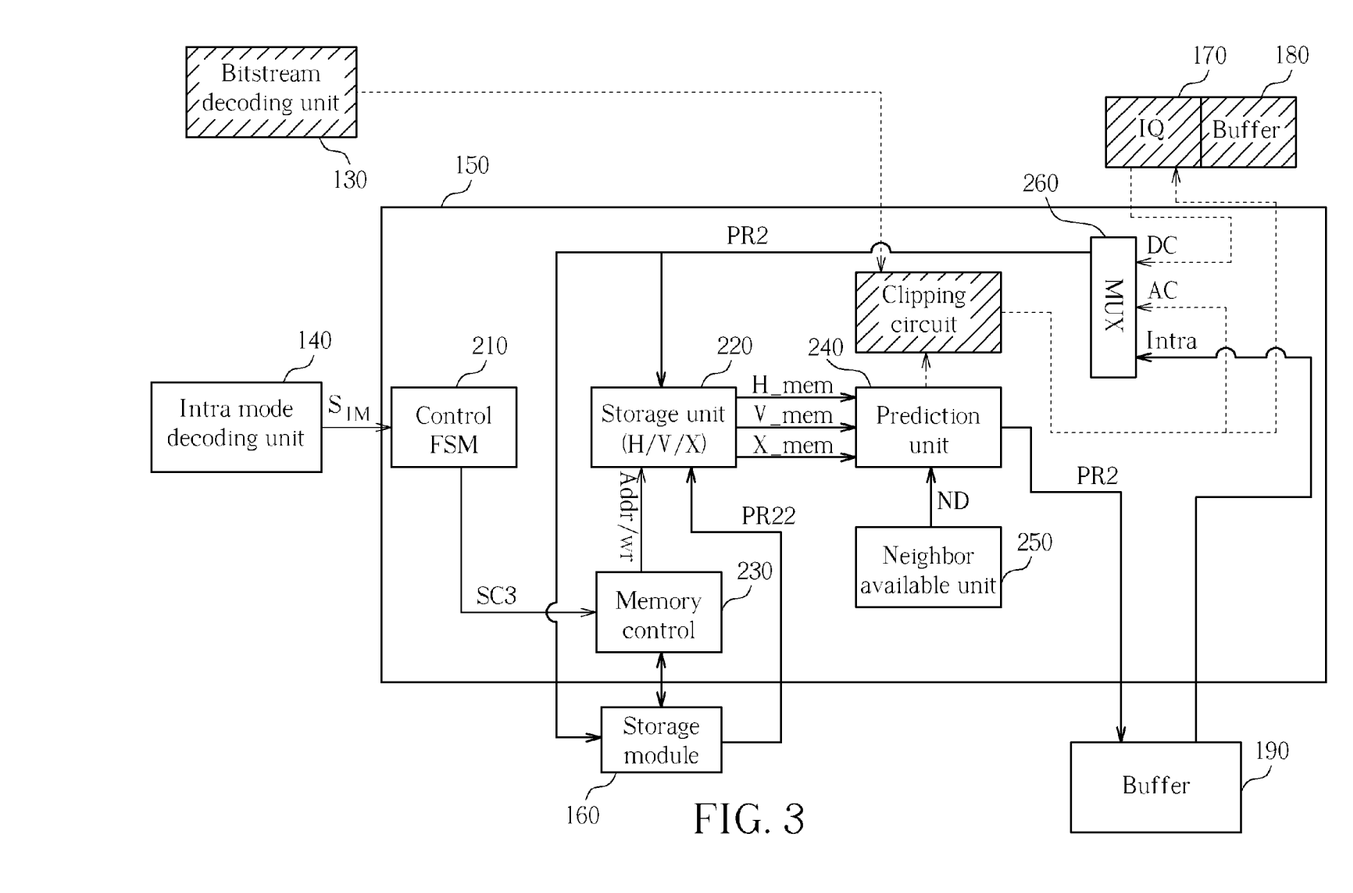

FIG. 2 and FIG. 3 are diagrams showing detailed components and detailed data flows of the shared prediction module 150 shown in FIG. 1, wherein FIG. 2 represents a first condition that the shared prediction module 150 is configured to perform the AC/DC prediction operation, and FIG. 3 represents a second condition that the shared prediction module 150 is configured to perform the intra prediction operation. In order words, in FIG. 2, the AC/DC prediction operation is activated while the intra prediction operation is inactivated; in FIG. 3, the intra prediction operation is activated while the AC/DC prediction operation is inactivated.

As shown in FIG. 2, the shared prediction module 150 includes a plurality of shared components, including a control finite state machine (FSM) 210, a storage unit 220, a memory control 230, a prediction unit 240, a neighbor available unit 250, and a multiplexing unit 260. The control FSM 210 generates a state control signal SC3 to the memory control 230, and then the memory control 230 controls read/write operations of the storage module 160 according to the state control signal SC3. For example, the memory control 230 controls addresses and corresponding data of the previous first prediction result PR11. The storage unit 220 is used for storing the previous first prediction result PR11 derived from the storage module 160 or fed back from the shared prediction module 150. In this embodiment, the previous first prediction result PR11 stored in the storage unit 220 includes a horizontal data H_mem, a vertical data V_mem, and a diagonal data X_mem. Furthermore, the neighbor available unit 250 is coupled to the prediction unit 240 for providing a neighbor default data ND, wherein the neighbor default data ND is used in boundary blocks/pixels. After that, the prediction unit 240 is coupled to the storage unit 220 and the neighbor available unit 250, for making use of at least the previous first prediction result PR11 (including the horizontal data H_mem, the vertical data V_mem, and the diagonal data X_mem) and/or the neighbor default data ND to generate the current first prediction result PR1. In addition, a clipping circuit 270 is coupled to the prediction unit 240 for clipping the current first prediction result PR1 so as to generate AC coefficients and DC coefficients (via the inverse quantization unit 170) of the current block to be stored in the first buffer 180. Finally, the multiplexing unit 260 selects the DC coefficients together with the AC coefficients as the current first prediction result PR1 to be written back into the storage unit 220 and the storage module 160.

As shown in FIG. 3, the shared prediction module 150 also includes a plurality of shared components, including a control finite state machine (FSM) 210, a storage unit 220, a memory control 230, a prediction unit 240, a neighbor available unit 250, and a multiplexing unit 260. The control FSM 210 generates a state control signal SC3 to the memory control 230 according to the intra mode signal $S_{IM}$, and then the memory control 230 controls read/write operations of the storage module 160 according to the state control signal SC3. For example, the memory control 230 controls address and corresponding data of the previous second prediction result PR22. The storage unit 220 is used for storing the previous second prediction result PR22 derived from the storage module 160 or fed back from the shared prediction module 150. In this embodiment, the previous second prediction result PR22 stored in the storage unit 220 includes a horizontal data H_mem, a vertical data V_mem, and a diagonal data X_mem. Furthermore, the neighbor available unit 250 is coupled to the prediction unit 240 for providing a neighbor default data ND, wherein the neighbor default data ND is used in boundary blocks/pixels. After that, the prediction unit 240 is coupled to the storage unit 220 and the neighbor available unit 250, for making use of at least the previous second prediction result PR22 (including the horizontal data H_mem, the vertical data V_mem, and the diagonal data X_mem) and/or the neighbor default data ND to generate the current second prediction result PR2. The second buffer 190 then stores the current second prediction result PR2. Finally, the multiplexing unit 260 selects the current second prediction result PR2 to be written back into the storage 220 and the storage module 160.

What calls for special attention is that, the plurality of shared components (including the control FSM 210, the storage unit 220, the memory control 230, the prediction unit 240, the neighbor available unit 250, and the multiplexing unit 260) are utilized in each of the AC/DC prediction operation and the intra prediction operation. Therefore, a generalized architecture containing AC/DC prediction and intra prediction is proposed in the present invention, so that the hardware cost can be reduced but also different spec requirements for multi-format video decoder can be fulfilled.

That is to say, when the video bitstream BS conforms to a first standard (e.g., an MPEG-4 specification or a VC-1 specification), the system controller 120 generates the first control signal SC1 to enable the bitstream decoding unit 130. At this time, the shared prediction module 150 is configured to perform the AC/DC prediction operation. When the video bitstream BS conforms to a second standard (e.g., an H.264/AVC specification, a RMVB specification, or an AVS specification) different from the first standard, the system controller 120 generates the second control signal SC2 to enable the intra mode decoding unit 140. At this time, the shared prediction module 150 is configured to perform the intra prediction operation.

Additionally, in some exemplary systems, there may be, for example, nine kinds of intra prediction modes for 4×4 intra blocks and 8×8 intra blocks (for example, H.264 containing vertical prediction mode 0, horizontal prediction mode 1, DC prediction mode 2, diagonal down-left prediction mode 3, diagonal down-right prediction mode 4, vertical-right prediction mode 5, horizontal-down prediction mode 6, vertical-left prediction mode 7, and horizontal-up prediction mode 8), and there may be four kinds of intra prediction modes for 16×16 intra blocks (for example, H.264 containing vertical prediction mode 1, horizontal prediction mode 2, DC prediction mode 0, and plane prediction mode 3). Summarize the intra prediction modes of the AVS, H.264, and RV specifications, and thus similar characters can be found. As a result, the prediction unit 240 shown in FIG. 3 can be further simplified.

Figure 4:
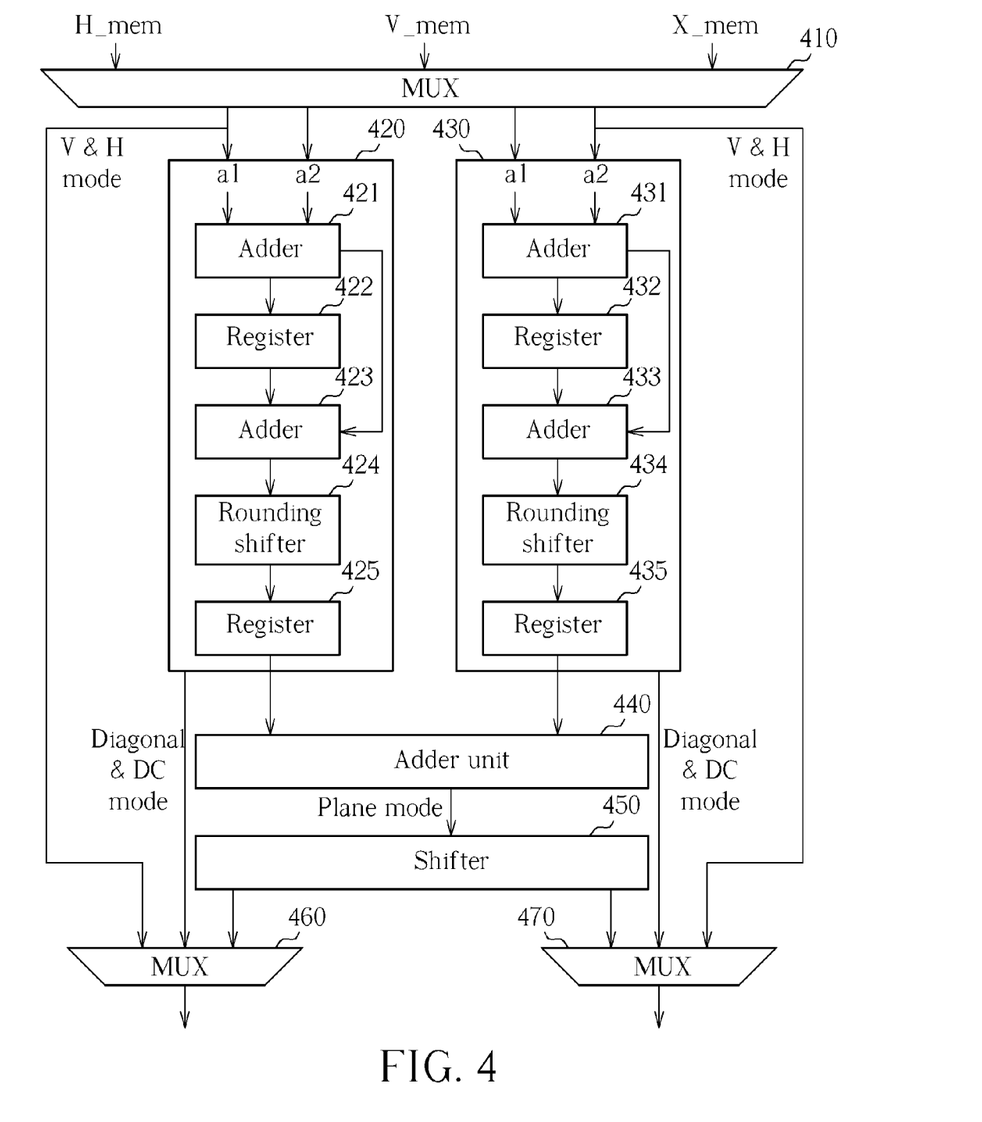
FIG. 4 is a diagram showing an exemplary embodiment of the prediction unit shown in FIG. 3.

Please refer to FIG. 4. FIG. 4 is a diagram showing an exemplary embodiment of the prediction unit 240 shown in FIG. 3. In this embodiment, the prediction unit 240 includes, but is not limited to, a first multiplexer 410, a first operating unit 420, a second operating unit 430, an adder unit 440, a shifter 450, a second multiplexer 460, and a third multiplexer 470. The first multiplexer 410 selectively outputs at least one of the horizontal data H_mem, the vertical data V_mem, and the diagonal data X_mem, and accordingly generates a first multiplexer output (e.g., "a1" and/or "a2"). The first operating unit 420 and the second operating unit 430 are coupled to the first multiplexer 410. The first operating unit 420 generates a first operating result according to the first multiplexer output; and the second operating unit 430 generates a second operating result according to the first multiplexer output. Be noted that, in this embodiment, the first operating unit 420 is implemented by a plurality of adders 421 and 423, a plurality of registers 422 and 425, and a rounding shifter 424; and the second operating unit 430 is implemented by a plurality of adders 431 and 433, a plurality of registers 432 and 435, and a rounding shifter 434, but this should not be considered as a limitation of the present invention. In addition, the connection manner of these components is already shown in FIG. 4, and further description is omitted here for brevity.

Moreover, an adder unit 440 is coupled to the first operating unit 420 and the second operating unit 430, for summing up the first operating result and the second operating result to generate a summing result. A shifter 450 is coupled to the adder unit 440 for shifting the summing result to generate a first shifted result and a second shifted result. After that, the second multiplexer 460 is coupled to the first multiplexer 410, the first operating unit 420, and the shifter 450, for selectively outputting the first multiplexer output, the first operating result, or the first shifted result. Similarly, the third multiplexer 470 is coupled to the first multiplexer 410, the second operating unit 430, and the shifter 450, for selectively outputting the first multiplexer output, the second operating result, or the second shifted result.

What calls for special attention is that the first operating unit 420 and the second operating unit 430 are used for sharing the diagonal prediction modes and DC prediction mode; and the extra adder unit 440 as well as the shifter 450 are used to form the plane prediction mode. As for the vertical prediction mode and horizontal prediction mode, the first multiplexer output can be directly outputted without any operation.

The embodiment above is presented merely for describing features of the present invention, and in no way should be considered as limitations of the scope of the present invention. Certainly, people skilled in the art will readily appreciate that other designs for implementing the prediction unit 240 of the shared prediction module 150 are feasible.

Figure 5:
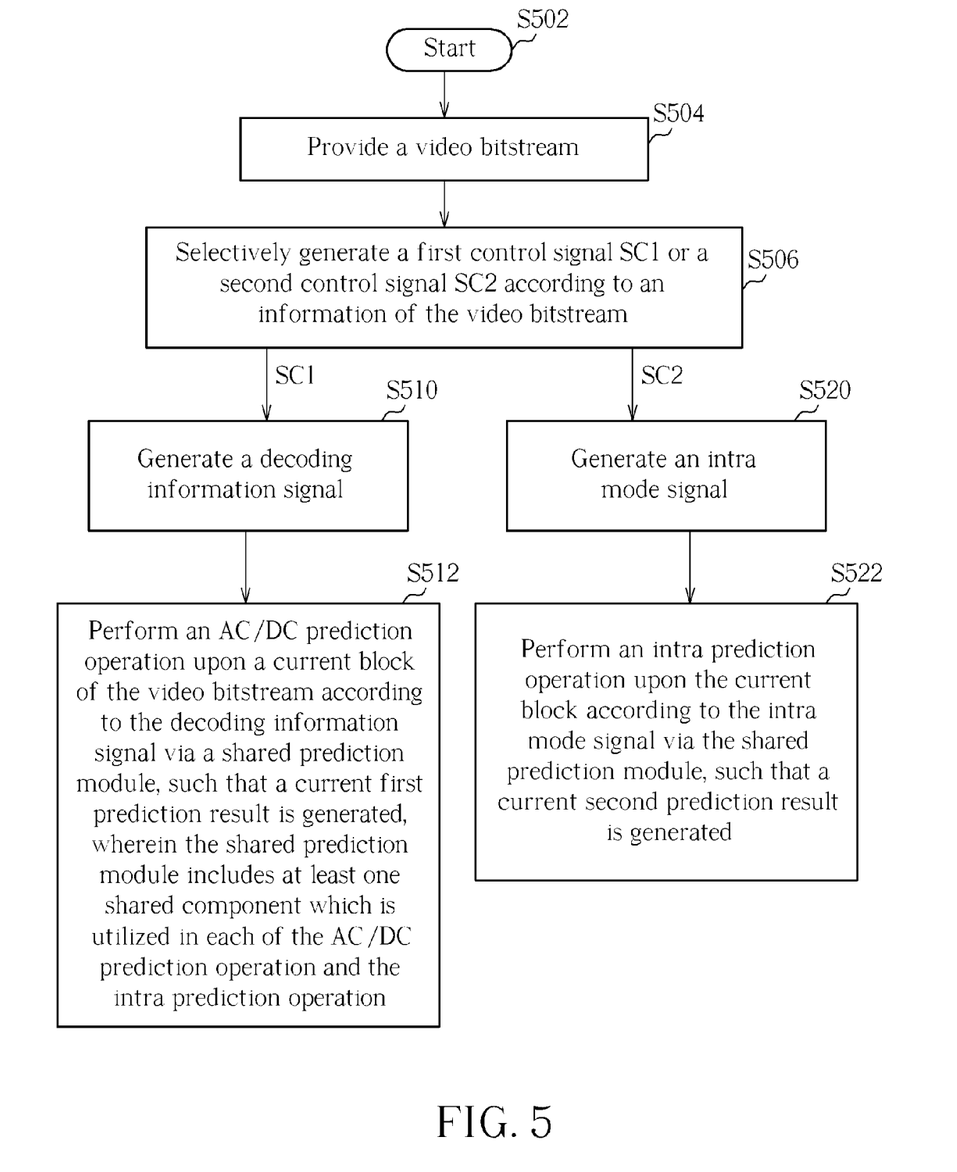
FIG. 5 is a flowchart illustrating a decoding method according to an exemplary embodiment of the present invention.

FIG. 5 is a flowchart illustrating a decoding method according to an exemplary embodiment of the present invention. Please note that the following steps are not limited to be performed according to the exact sequence shown in FIG. 5 if a roughly identical result can be obtained. The method includes, but is not limited to, the following steps:

Step S502: Start.
Step S504: Provide a video bitstream.
Step S506: Selectively generate a first control signal or a second control signal according to an information of the video bitstream.
Step S510: When receiving the first control signal, generate a decoding information signal according to the information of the video bitstream.
Step S512: Perform an AC/DC prediction operation upon a current block of the video bitstream according to the decoding information signal via a shared prediction module, such that a current first prediction result is generated, wherein the shared prediction module includes at least one shared component which is utilized in each of the AC/DC prediction operation and the intra prediction operation.
Step S520: When receiving the second control signal, generate an intra mode signal.
Step S522: Perform an intra prediction operation upon the current block according to the intra mode signal via the shared prediction module, such that a current second prediction result is generated.

How each element operates can be known by collocating the steps shown in FIG. 5 and the elements shown in FIG. 1, and further description is omitted here for brevity. Be noted that the step S504 is executed by the bitstream buffer 110, the step S506 is executed by the system controller 120, the step S510 is executed by the bitstream decoding unit 130, the step S520 is executed by the intra mode decoding unit 140, and the steps S512 and S522 are executed by the shared prediction module 150.

Please note that, the steps of the abovementioned flowchart are merely a practicable embodiment of the present invention, and in no way should be considered to be limitations of the scope of the present invention. The method can include other intermediate steps or several steps can be merged into a single step without departing from the spirit of the present invention.

The abovementioned embodiments are presented merely for describing features of the present invention, and in no way should be considered to be limitations of the scope of the present invention. In summary, the present invention provides a multi-format video decoder and a related decoding method. By making use of sharing data as well as shared components (including the control FSM 210, the storage unit 220, the memory control 230, the prediction unit 240, the neighbor available unit 250, and the multiplexing unit 260) of the prediction module in each of the AC/DC prediction operation and intra prediction operation, the hardware cost can be reduced but also different spec requirements for multi-format video decoder can be fulfilled. Moreover, since there are many similar characters existed in the intra prediction modes of the AVS, H.264, and RV specifications, the prediction unit 240 used in the intra prediction operation can be further simplified. Therefore, the hardware cost and the chip areas of the multi-format video decoder can be further saved.

Those skilled in the art will readily observe that numerous modifications and alterations of the device and method may be made while retaining the teachings of the invention.

What is claimed is:

1. A multi-format video decoder, comprising:
   a bitstream buffer, for providing a video bitstream;
   a system controller, coupled to the bitstream buffer, for selectively generating a first control signal or a second control signal according to an information of the video bitstream;
   a bitstream decoding unit, coupled to the system controller and the bitstream buffer, for generating a decoding information signal according to the information of the video bitstream when receiving the first control signal;
   an intra mode decoding unit, coupled to the system controller, for generating an intra mode signal when receiving the second control signal; and
   a shared prediction module, coupled to the bitstream decoding unit and the intra mode decoding unit, for performing an AC/DC prediction operation upon a current block of the video bitstream to generate a current first prediction result according to the decoding information signal, and for performing an intra prediction operation upon the current block to generate a current second prediction result according to the intra mode signal, wherein the shared prediction module includes at least one shared component which is utilized in each of the AC/DC prediction operation and the intra prediction operation;
   wherein the shared prediction module comprises a prediction unit, and the prediction unit comprises:
   a first multiplexer, arranged for selectively outputting at least one of a horizontal data, a vertical data, and a diagonal data, and accordingly generating a first multiplexer output;
   a first operating unit, coupled to the first multiplexer, for generating a first operating result according to the first multiplexer output;
   a second operating unit, coupled to the first multiplexer, for generating a second operating result according to the first multiplexer output;
   an adder unit, coupled to the first operating unit and the second operating unit, for summing up the first operating result and the second operating result to generate a summing result;
   a shifter, coupled to the adder unit, for shifting the summing result to generate a first shifted result and a second shifted result;
   a second multiplexer, coupled to the first multiplexer, the first operating unit, and the shifter, for selectively outputting the first multiplexer output, the first operating result, or the first shifted result; and
   a third multiplexer, coupled to the first multiplexer, the second operating unit, and the shifter, for selectively outputting the first multiplexer output, the second operating result, or the second shifted result.

2. The multi-format video decoder of claim 1, further comprising:
   a storage module, coupled to the shared prediction module, for storing the current first prediction result and the current second prediction result, and for storing a previous first prediction result and a previous second prediction result;
   wherein the previous first prediction result is generated by performing the AC/DC prediction operation upon a decoded block of the video bitstream which is previously decoded prior to the current block; and the previous second prediction result is generated by performing the intra prediction operation upon the decoded block.

3. The multi-format video decoder of claim 2, wherein the shared prediction module comprises a plurality of shared components, including:
   a storage unit, for storing the previous first prediction result derived from the storage module or fed back from the shared prediction module; and
   the prediction unit, coupled to the storage unit, for making use of at least the previous first prediction result to generate the current first prediction result.

4. The multi-format video decoder of claim 3, wherein the plurality of shared components further include:
   a neighbor available unit, coupled to the prediction unit, for providing a neighbor default data, wherein the prediction unit makes use of at least the previous first prediction result or the neighbor default data to generate the current first prediction result according to the decoding information signal.

5. The multi-format video decoder of claim 3, wherein the previous first prediction result stored in the storage unit comprises the horizontal data, the vertical data, and the diagonal data.

6. The multi-format video decoder of claim 2, wherein the shared prediction module comprises a plurality of shared components, including:
   a storage unit, for storing the previous second prediction result derived from the storage module or fed back from the shared prediction module; and
   the prediction unit, coupled to the storage unit, for making use of at least the previous second prediction result to generate the current second prediction result according to the intra mode signal.

7. The multi-format video decoder of claim 6, wherein the shared components further include:
   a neighbor available unit, coupled to the prediction unit, for providing a neighbor default data, wherein the prediction unit makes use of at least the previous second prediction result or the neighbor default data to generate the current second prediction result according to the intra mode signal.

8. The multi-format video decoder of claim 6, wherein the previous second prediction result stored in the storage unit comprises the horizontal data, the vertical data, and the diagonal data.

9. The multi-format video decoder of claim 1, wherein the first operating unit comprises a plurality of adders, a plurality of registers, and a rounding shifter; and the second operating unit comprises a plurality of adders, a plurality of registers, and a rounding shifter.

10. The multi-format video decoder of claim 1, wherein the current first prediction result comprises DC coefficients and AC coefficients of the current block.

11. The multi-format video decoder of claim 1, wherein when the video bitstream conforms to a first standard, the system controller generates the first control signal to enable the bitstream decoding unit, and the shared prediction module is configured to perform the AC/DC prediction operation; and when the video bitstream conforms to a second standard different from the first standard, the system controller generates the second control signal to enable the intra mode decoding unit, and the shared prediction module is configured to perform the intra prediction operation.

12. The multi-format video decoder of claim 11, wherein the first standard comprises an MPEG-4 specification or a VC-1 specification; and the second standard comprises an H.264/AVC specification, a RMVB specification, or an AVS specification.

13. A decoding method, comprising steps of:
providing a video bitstream;
selectively generating a first control signal or a second control signal according to an information of the video bitstream;
when receiving the first control signal, generating a decoding information signal according to the information of the video bitstream;
performing an AC/DC prediction operation upon a current block of the video bitstream according to the decoding information signal via a shared prediction module, such that a current first prediction result is generated;
when receiving the second control signal, generating an intra mode signal;
performing an intra prediction operation upon the current block according to the intra mode signal via the shared prediction module, such that a current second prediction result is generated;
selectively outputting at least one of a horizontal data, a vertical data, and a diagonal data, and accordingly generating a first multiplexer output;
generating a first operating result according to the first multiplexer output;
generating a second operating result according to the first multiplexer output;
summing up the first operating unit and the second operating result to generate a summing result;
shifting the summing result to generate a first shifted result and a second shifted result;
selectively outputting the first multiplexer output, the first operating result, or the first shifted result; and
selectively outputting the first multiplexer output, the second operating result, or the second shifted result;
wherein the shared prediction module includes at least one shared component which is utilized in each of the AC/DC prediction operation and the intra prediction operation.

14. The method of claim 13, further comprising a step of:
storing the current first prediction result and the current second prediction result.

15. The method of claim 14, further comprising steps of:
performing the AC/DC prediction operation upon a decoded block of the video bitstream which is previously decoded prior to the current block according to the decoding information signal via the shared prediction module, such that a previous first prediction result is generated;
performing the intra prediction operation upon the neighboring decoded block according to the intra mode signal via the shared prediction module, such that a previous second prediction result is generated; and
storing the previous first prediction result and the previous second prediction result.

16. The method of claim 15, further comprising steps of:
providing a neighbor default data;
the step of performing the AC/DC prediction operation upon the current block of the video bitstream comprises:
making use of at least the previous first prediction result or the neighbor default data to generate the current first prediction result according to the decoding information signal; and
the step of performing the intra prediction operation upon the current block comprises:
making use of at least the previous second prediction result or the neighbor default data to generate the current second prediction result according to the intra mode signal.

17. The method of claim 15, wherein the previous second prediction result comprises a horizontal data, a vertical data, and a diagonal data.

18. The method of claim 13, wherein when the video bitstream conforms to a first standard, the first control signal is accordingly generated to perform the AC/DC prediction operation; and when the video bitstream conforms to a second standard, the second control signal is accordingly generated to perform the intra prediction operation.

19. The method of claim 18, wherein the first standard comprises an MPEG-4 specification or a VC-1 specification; and the second standard comprises an H.264/AVC specification, a RMVB specification, or an AVS specification.

* * * * *